(12) United States Patent
He et al.

(10) Patent No.: US 12,461,028 B2
(45) Date of Patent: Nov. 4, 2025

(54) METHOD AND DEVICE FOR INVERTING OCEAN-ATMOSPHERE OPTICAL PARAMETERS AND STORAGE MEDIUM

(71) Applicant: SECOND INSTITUTE OF OCEANOGRAPHY, MNR, Zhejiang (CN)

(72) Inventors: Xianqiang He, Hangzhou (CN); Tianfeng Pan, Hangzhou (CN); Yan Bai, Hangzhou (CN); Fang Gong, Hangzhou (CN); Teng Li, Nanjing (CN); Difeng Wang, Hangzhou (CN)

(73) Assignee: SECOND INSTITUTE OF OCEANOGRAPHY, MNR, Hangzhou (CN)

( * ) Notice: Subject to any disclaimer, the term of this patent is extended or adjusted under 35 U.S.C. 154(b) by 0 days.

(21) Appl. No.: 18/952,261

(22) Filed: Nov. 19, 2024

(65) Prior Publication Data
US 2025/0180477 A1    Jun. 5, 2025

(30) Foreign Application Priority Data
Nov. 30, 2023    (CN) .......................... 202311624941.8

(51) Int. Cl.
*G01N 21/53*    (2006.01)
*G01N 21/17*    (2006.01)
(Continued)

(52) U.S. Cl.
CPC ............. *G01N 21/53* (2013.01); *G01N 33/18* (2013.01); *G06F 17/16* (2013.01); *G01N 2021/1793* (2013.01)

(58) Field of Classification Search
CPC ................... G01N 21/53; G01N 33/18; G01N 2021/1793; G06F 17/16
See application file for complete search history.

(56) References Cited

U.S. PATENT DOCUMENTS

2022/0042924 A1*   2/2022   Beckett ................ B22F 10/38
2022/0383102 A1   12/2022   Le et al.

FOREIGN PATENT DOCUMENTS

CN     102103204 A     6/2011
CN     114218786 A     3/2022
(Continued)

OTHER PUBLICATIONS

Office Action issued on Jan. 6, 2024, in corresponding Chinese Application No. 202311624941.8, 17 pages.
(Continued)

*Primary Examiner* — Lisa M Caputo
*Assistant Examiner* — Cynthia L Davis
(74) *Attorney, Agent, or Firm* — Maier & Maier, PLLC (57) ABSTRACT

A method and device for inverting ocean-atmosphere optical parameters and storage medium. The method includes: obtaining a vector apparent reflectance $\rho_I$, $\rho_Q$, $\rho_U$ of water-leaving radiance at top of atmosphere and observation geometry of a multi-angle polarized satellite, and inputting the vector apparent reflectance $\rho_I$, $\rho_Q$, $\rho_U$ and the observation geometry into a trained ocean-atmosphere optical parameter model, to output a group of ocean-atmosphere optical parameters, the output ocean-atmosphere optical parameters comprise: $P_{BOA}{}^w$, FAOD/CAOD, FRm/CRm, W, CHL and SPM, the ocean-atmosphere optical parameter model is an XGBoost machine training model. In this way, the ocean-atmosphere optical parameters can be quickly and stably inverted.

11 Claims, 3 Drawing Sheets

(51) Int. Cl.
*G01N 33/18* (2006.01)
*G06F 17/16* (2006.01)

(56) References Cited

FOREIGN PATENT DOCUMENTS

| | | | | |
|---|---|---|---|---|
| CN | 114544452 A | * | 5/2022 | ......... G01B 11/0641 |
| CN | 115356249 A | | 11/2022 | |
| CN | 115630256 A | | 1/2023 | |
| CN | 116148189 A | | 5/2023 | |
| CN | 116297068 A | * | 6/2023 | |
| CN | 116380846 A | * | 7/2023 | |
| CN | 116698691 A | | 9/2023 | |
| KR | 20100029529 A | | 3/2010 | |
| KR | 20160073845 A | | 6/2016 | |

OTHER PUBLICATIONS

Notice of Registration and Notice of Granting Invention Patent Right issued on Jan. 17, 2024, in corresponding Chinese Application No. 202311624941.8, 12 pages.
Cheng Tianhai et al., "Cloud Phase Classfication and Validation Based on Multi-Angular Polarized Characteristics of Cloud", Acta Optica Sinica, vol. 28, No. 10, Oct. 2008, 1849-1855, 7 pages.

* cited by examiner

METHOD AND DEVICE FOR INVERTING OCEAN-ATMOSPHERE OPTICAL PARAMETERS AND STORAGE MEDIUM

FIELD

The present disclosure relates to the field of remote sensing image application, in particular relates to a method and device for inverting ocean-atmosphere optical parameters and storage medium.

BACKGROUND

Over the past 50 years, remote sensing techniques have been widely used to assess the primary productivity and phytoplankton dynamics of the global ocean. The key process of atmospheric correction (AC) is realized through the ocean water color data processing scheme, that is, the radiance caused by the atmospheric contribution is estimated and eliminated from top of atmosphere (TOP) radiance, so as to invert the required water-leaving radiation signal. There is great potential to improve the amount and accuracy of inversion information by using remote sensing technology. Multi-angle polarimetry is one of the most powerful tools for ocean water color observations from satellites and low-altitude platforms, and can be used to characterize atmospheric and ocean properties and for a variety of applications. Among atmospheric components, aerosol particles are defined by their size, shape, density, composition, and vertical distribution. In order to ensure reliable monitoring of global scale parameters and their variations, atmospheric correction of the radiation caused by aerosols is very important. This highlights the importance of understanding the spatial, temporal and vertical distribution of aerosols for accurate atmospheric correction of satellite data and inversion of the intrinsic optical properties (IOP) of water body and component concentrations. In the UV-short wave infrared (UV-SWIR) band, multi-angle polarization observation can provide valuable implicit information about atmospheric aerosol and water IOP for atmospheric radiation scattering process and water scattering process.

However, until now there have been few schemes for using polarization AC technique to invert polarization water-leaving radiance and IOP of water body.

SUMMARY

In order to solve the problems in related techniques at least to a certain extent, the present application provides a method for inverting ocean-atmosphere optical parameters. The method includes:
obtaining a vector apparent reflectance $\rho_I$, $\rho_Q$, $\rho_U$ of water-leaving radiance at top of atmosphere and observation geometry of a multi-angle polarized satellite, wherein the observation geometry comprises three angles: a solar zenith angle, a view zenith angle and a relative azimuth angle;
inputting the vector apparent reflectance $\rho_I$, $\rho_Q$, $\rho_U$ and the observation geometry into a trained ocean-atmosphere optical parameter model, to output a group of ocean-atmosphere optical parameters, wherein the output ocean-atmosphere optical parameters comprise: a vector apparent reflectance $\vec{\rho}_{BOA}{}^w$ of water-leaving radiance at bottom of atmosphere above sea surface of the multi-angle polarized satellite, a fine/coarse mode aerosol optical thickness, a fine/coarse mode aerosol particle size distribution radius, a sea surface wind speed, a chlorophyll concentration and a suspended particulate matter concentration;
wherein the ocean-atmosphere optical parameter model is an XGBoost machine training model,
wherein the method further comprises training the ocean-atmosphere optical parameter model, and the training comprises:
obtaining multiple groups of sample ocean-atmosphere optical parameters, the sample ocean-atmosphere optical parameters in each group comprise a sample fine/coarse mode aerosol optical thickness, a sample aerosol complex refraction index real/imaginary part, a sample fine/coarse mode aerosol particle size distribution radius, a sample sea surface wind speed, a sample chlorophyll concentration, a sample yellow substance absorption coefficient, a sample yellow substance absorption spectrum slope, and a sample suspended particulate matter concentration;
obtaining a sample observation geometry of the multi-angle polarized satellite;
inputting the multiple groups of sample ocean-atmosphere optical parameters and the sample observation geometry into an Ocean Successive Orders with Atmosphere-Advanced radiative transfer model, to output a vector apparent reflectance $\vec{\rho}_{TOA}{}^w$ of water-leaving radiance at top of atmosphere, and obtaining a first vector apparent reflectance $\vec{\rho}_{BOA}{}^w$ of water-leaving radiance at bottom of atmosphere above sea surface; and
training the ocean-atmosphere optical parameter model by using the multiple groups of sample ocean-atmosphere optical parameters, the sample observation geometry, the vector apparent reflectance $\vec{\rho}_{TOA}{}^w$ of water-leaving radiance at top of atmosphere and the first vector apparent reflectance $\vec{\rho}_{BOA}{}^w$ of water-leaving radiance at bottom of atmosphere above sea surface.

Further, the ocean-atmosphere optical parameter model comprises a $\vec{\rho}_{BOA}{}^w$ module, an atmosphere module and a water color module,
the $\vec{\rho}_{BOA}{}^w$ module is configured to output $\vec{\rho}_{BOA}{}^w$ based on the inputted sample observation geometry and $\vec{\rho}_{TOA}{}^w$, the atmosphere module is configured to output the sample fine/coarse mode aerosol optical thickness, the sample fine/coarse mode aerosol particle size distribution radius and the sample sea surface wind speed based on the inputted sample observation geometry and $\vec{\rho}_{TOA}{}^w$, and the water color module is configured to output the sample chlorophyll concentration and the sample suspended particulate matter concentration based on $\vec{\rho}_{BOA}{}^w$ outputted from the $\vec{\rho}_{BOA}{}^w$ module.

Further, the $\vec{\rho}_{BOA}{}^w$ module, the atmosphere module and the water color module are all based on XGBoost model.

Further, training the ocean-atmosphere optical parameter model further comprises: logarithmic processing a vector apparent radiation quantity $\vec{\rho}_{I,TOA}$ at top of atmosphere by:

$$\vec{\rho}_{TOA} \rightarrow \text{sign}(\vec{\rho}_{TOA}) \cdot \log_{10}|\vec{\rho}_{TOA}|$$

wherein sign $$(x) = \begin{cases} 1, x > 0 \\ 0, x = 0 \\ -1, x < 0 \end{cases}.$$

Further, obtaining multiple groups of sample ocean-atmosphere optical parameters comprises:
  analyzing historical remote sensing data of the multi-angle polarized satellite to obtain a basic ocean-atmosphere optical parameter table, wherein the basic ocean-atmosphere optical parameter table comprises: a distribution, a maximum value, a minimum value, an average value and a standard deviation of each of fine/coarse mode aerosol optical thicknesses, aerosol complex refraction index real/imaginary parts, fine/coarse mode aerosol particle size distribution radiuses, sea surface wind speeds, chlorophyll concentrations, yellow substance absorption coefficients, yellow substance absorption spectrum slopes and suspended particulate matter concentrations; and
  selecting the multiple groups of sample ocean-atmosphere optical parameters based on the distribution, the maximum value, the minimum value, the average value and the standard deviation of each parameter in the basic ocean-atmosphere optical parameter table.

Further, inputting the multiple groups of sample ocean-atmosphere optical parameters and the sample observation geometry into the Ocean Successive Orders with Atmosphere-Advanced radiative transfer model, to output a vector apparent reflectance $\vec{\rho}_{TOA}^{w}$ of water-leaving radiance at top of atmosphere comprises:
  calculating a scattering matrix $F_{oc}$ of open ocean water by following formula:

$$F_{oc} \equiv F_{oc}(\lambda, \Theta) = \frac{b_w(\lambda)F_w(\Theta) + b_{ph}(\lambda)F_{ph}(\Theta) + b_{SPM}(\lambda)F_{SPM}(\Theta)}{b_w(\lambda) + b_{ph}(\lambda) + b_{SPM}(\lambda)}$$

wherein $\Theta$ is a scattering angle, $b_w(\lambda)$, $b_{ph}(\lambda)$ and $b_{SPM}(\lambda)$ are scattering coefficients of pure seawater, phytoplankton and suspended particulate matter respectively, and $F_w(\Theta)$, $F_{ph}(\Theta)$ and $F_{SPM}(\Theta)$ are scattering matrixes of pure seawater, phytoplankton and suspended particulate matter respectively.

Further, the ocean-atmosphere optical parameters further comprise concentration of inorganic particulate matter in water body,
  calculating the concentration of inorganic particulate matter in water body by following formula:

$$DoLP = \frac{\sqrt{(\rho_{Q,BOA}^w)^2 + (\rho_{U,BOA}^w)^2}}{\rho_{I,BOA}^w}$$

$$IPM = 1.469 \ln(DoLP - 44.498) + 5.957$$

wherein $\vec{\rho}_{I,BOA}^{w}$, $\rho_{Q,BOA}^{w}$, $\rho_{U,BOA}^{w}$ are calculated through a polarization angle.

The present application provides a device for inverting ocean-atmosphere optical parameters. The device includes a memory and a processor coupled to the memory, the processor is configured to execute, based on instructions stored in the memory, steps of the above method for inverting ocean-atmosphere optical parameters.

The present application provides a storage medium comprising an executable program stored thereon, the executable program, when being executed, execute steps of the above method for inverting ocean-atmosphere optical parameters.

According to embodiments of this application, a vector apparent reflectance $\rho_I$, $\rho_Q$, $\rho_U$ of water-leaving radiance at top of atmosphere and observation geometry of a multi-angle polarized satellite are obtained, and the vector apparent reflectance $\rho_I$, $\rho_Q$, $\rho_U$ and the observation geometry are inputted into a trained ocean-atmosphere optical parameter model, to output a group of ocean-atmosphere optical parameters. The output ocean-atmosphere optical parameters include a vector apparent reflectance $\vec{\rho}_{BOA}^{w}$ of water-leaving radiance at bottom of atmosphere above sea surface of the multi-angle polarized satellite, a fine/coarse mode aerosol optical thickness, a fine/coarse mode aerosol particle size distribution radius, a sea surface wind speed, a chlorophyll concentration and a suspended particulate matter concentration. The ocean-atmosphere optical parameter model is an XGBoost machine training model. In this way, the ocean-atmosphere optical parameters can be quickly and stably obtained.

BRIEF DESCRIPTION OF THE DRAWINGS

The attached drawings below are part of this application and show embodiments of this application. They are used together with the description of the specification to illustrate the principle of this application.

DETAILED DESCRIPTION

In order to make the purpose, technical solutions and advantages of the embodiments of this application clear, the contents of this application will be described by the attached drawings and detailed descriptions below, and the person skilled in the art after understanding the embodiments of the application can change and modify the solutions by the technology taught in the contents of this application, which does not deviate from the spirit and scope of this application.

Embodiments of this application are used to interpret but not limit the application. In addition, components with the same or similar labels used in the drawings and embodiments are used to represent the same or similar parts.

As used in this application, terms "first", "second" are not intended specifically to refer to an order or sequence, nor to limit this application, but only to distinguish components or operations described in the same technical terms.

The terms "include", "comprise", "have", "contain", etc. used in this application are all open terms, that is, they mean including but are not only including.

As used herein, "and/or" means any or all combinations of the things described.

"Multiple" in this application means "two" and "more than two". The term "multiple sets" in this application means "two sets" and "more than two sets".

Some terms used to describe this application are discussed below or elsewhere in this specification to provide additional guidance to those skilled in the art for the description of this application.

This application relates to a technique for inverting ocean-atmosphere optical parameters using remote sensing data of multi-angle polarized satellites. Currently, several polarized satellites have been launched, and many international and domestic space agencies plan to launch multiple advanced missions in the near future, including 3MI/MetOp-SG and SpexOne and HARP2 of PACE. These missions will provide polarization observations similar to those of the POLDER series (POLDER-I, POLDER-II, and PARASOL), designed to make comprehensive recordings of multi-angle and multi-spectral measurements. Based on this, this application proposes an XGBoost-based ocean-atmosphere optical parameter model, which can invert multiple ocean-atmosphere optical parameters by inputting multi-angle polarized satellite data.

Figure 1:
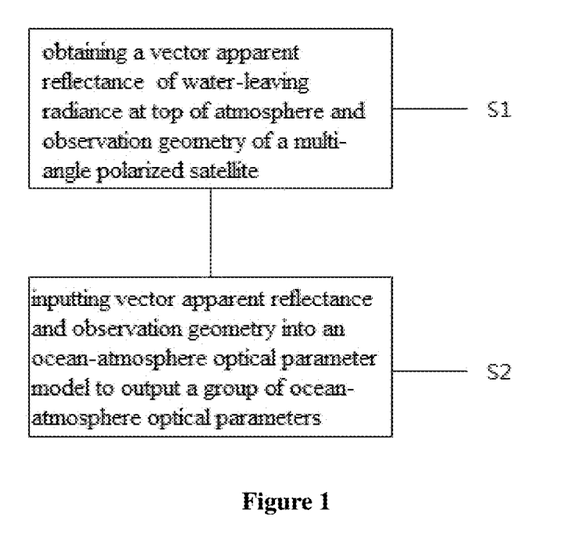
FIG. 1 is a flowchart of a method for inverting ocean-atmosphere optical parameters according to an embodiment of the disclosure.

FIG. 1 is a flowchart of a method for inverting ocean-atmosphere optical parameters according to an embodiment of the disclosure. As shown in FIG. 1, the method for inverting ocean-atmosphere optical parameters provided in the embodiment of the application includes the following steps S1-S2.

S1, obtaining a vector apparent reflectance $\rho_I$, $\rho_Q$, $\rho_U$ of water-leaving radiance at top of atmosphere (TOA) and observation geometry of a multi-angle polarized satellite.

$\rho_I$, $\rho_Q$, $\rho_U$ and observation geometry can be obtained directly from public data of the multi-angle polarized satellite.

The observation geometry includes three angles, which are a solar zenith angle (SZA), a view zenith angle (VZA) and a relative azimuth angle (RAA).

S2, inputting the vector apparent reflectance $\rho_I$, $\rho_Q$, $\rho_U$ and the observation geometry into a trained ocean-atmosphere optical parameter model, to output a group of ocean-atmosphere optical parameters. The output ocean-atmosphere optical parameters include: a vector apparent reflectance $\vec{\rho}_{BOA}^{w}$ of water-leaving radiance at bottom of atmosphere above sea surface (BOA) of the multi-angle polarized satellite, a fine/coarse mode aerosol optical thickness (FAOD/CAOD), a fine/coarse mode aerosol particle size distribution radius (FRm/CRm), a sea surface wind speed (W), a chlorophyll concentration (CHL) and a suspended particulate matter concentration (SPM).

The ocean-atmosphere optical parameter model is an XGBoost machine training model.

In an embodiment, the ocean-atmosphere optical parameter model includes a w module, an atmosphere module and a water color module. The $\vec{\rho}_{BOA}^{w}$ module is configured to output $\vec{\rho}_{BOA}^{w}$ based on the inputted vector apparent reflectance $\rho_I$, $\rho_Q$, $\rho_U$ and the observation geometry. The atmosphere module is configured to output the fine/coarse mode aerosol optical thickness, the fine/coarse mode aerosol particle size distribution radius and the sea surface wind speed based on the inputted vector apparent reflectance $\rho_I$, $\rho_Q$, $\rho_U$ and the observation geometry. The water color module is configured to output the chlorophyll concentration and the suspended particulate matter concentration based on $\vec{\rho}_{BOA}^{w}$ outputted from the $\vec{\rho}_{BOA}^{w}$ module.

In an embodiment, the method for inverting ocean-atmosphere optical parameters further includes: S3, training the ocean-atmosphere optical parameter model.

Figure 2:
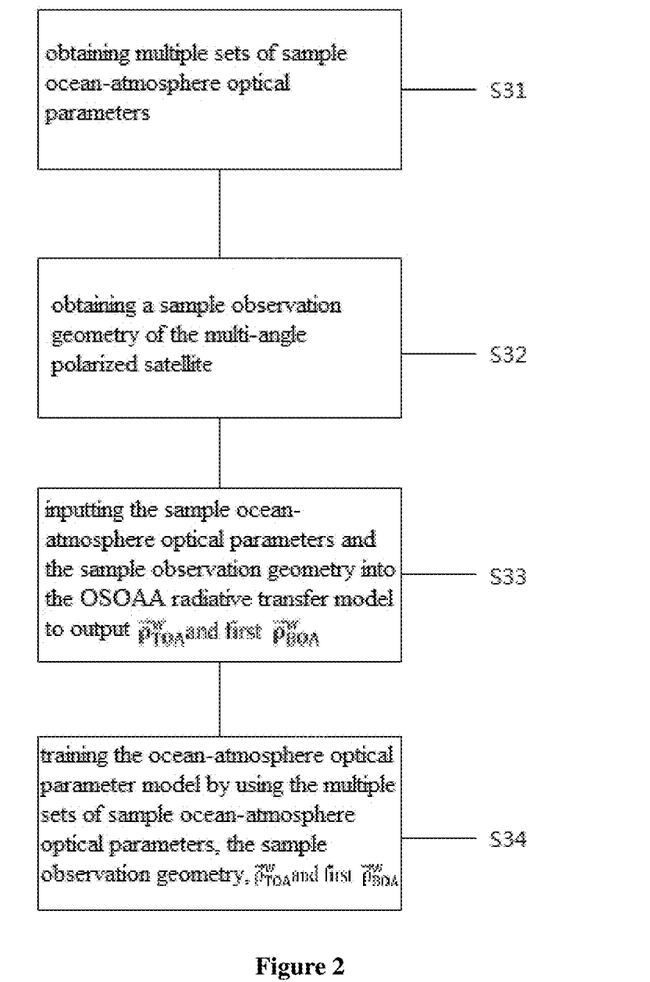
FIG. 2 is a flowchart of a method for training an ocean-atmosphere optical parameter model according to an embodiment of the disclosure.

In an embodiment, training the ocean-atmosphere optical parameter model includes the following four steps S31-S34, as shown in FIG. 2.

In this application, multiple ocean-atmosphere optical parameters are inverted through the ocean-atmosphere optical parameter model by using multi-angle polarized satellite data. When training the ocean-atmosphere optical parameter model, it is necessary to build a sample set for training the ocean-atmosphere optical parameter model.

S31, obtaining multiple groups of sample ocean-atmosphere optical parameters, the sample ocean-atmosphere optical parameters in each group comprise a sample fine/coarse mode aerosol optical thickness (FAOD/CAOD), a sample aerosol complex refraction index real/imaginary part (RRef/IRef), a sample fine/coarse mode aerosol particle size distribution radius (FRm/CRm), a sample sea surface wind speed (W), a sample chlorophyll concentration (CHL), a sample yellow substance absorption coefficient ($a_{dg}$), a sample yellow substance absorption spectrum slope (S), and a sample suspended particulate matter concentration (SPM).

The multiple groups of sample ocean-atmosphere optical parameters are historical data. In an embodiment, the multiple groups of ocean-atmosphere optical parameters are historical data over a period of 1-10 years.

In an embodiment, the sample fine/coarse mode aerosol optical thickness (FAOD/CAOD), the sample aerosol complex refraction index real/imaginary part (RRef/IRef), the sample sea surface wind speed (W), the sample chlorophyll concentration (CHL), the sample yellow substance absorption coefficient ($a_{dg}$), and the sample suspended particulate matter concentration (SPM) may be obtained from historical remote sensing data of the multi-angle polarized satellite. The sample fine/coarse mode aerosol particle size distribution radius (FRm/CRm) and the sample yellow substance absorption spectrum slope (S) may be empirical values.

In an embodiment, FAOD and CAOD may be the fine/coarse mode aerosol optical thickness at a specific band, such as the fine/coarse mode aerosol optical thickness at 865 nm, 670 nm or 490 nm. $a_{dg}$ may be the yellow substance absorption coefficient at a specific band, such as the yellow substance absorption coefficient at 440 nm. In this case, the ocean-atmosphere optical parameters also include band information of the satellite polarization sensor.

From the above, some training samples may be obtained by randomly selecting multiple groups of ocean-atmosphere optical parameters from the historical remote sensing data of the multi-angle polarized satellite. However, by randomly selecting multiple groups of ocean-atmosphere optical parameters as the samples, the subsequent training of the ocean-atmosphere optical parameter model may be not accurate enough.

In view of this, in an embodiment of the application, a method for obtaining multiple groups of sample ocean-atmosphere optical parameters includes:

S311, analyzing historical remote sensing data of the multi-angle polarized satellite to obtain a basic ocean-atmosphere optical parameter table. The basic ocean-atmosphere optical parameter table comprises: a distribution, a maximum value, a minimum value, an average value and a standard deviation of each of fine/coarse mode aerosol optical thicknesses (FAOD/CAOD), aerosol complex refraction index real/imaginary parts (RRef/IRef), fine/coarse mode aerosol particle size distribution radiuses (FRm/CRm), sea surface wind speeds (W), chlorophyll concentrations (CHL), yellow substance absorption coefficients ($a_{dg}$), yellow substance absorption spectrum slopes (S) and suspended particulate matter concentrations (SPM); and S312, selecting the multiple groups of sample ocean-atmosphere optical parameters based on the distribution, the maximum value, the minimum value, the average value and the standard deviation of each parameter in the basic ocean-atmosphere optical parameter table.

That is, a basic ocean-atmosphere optical parameter table is first constructed, and then samples are selected based on this table.

Figure 3:
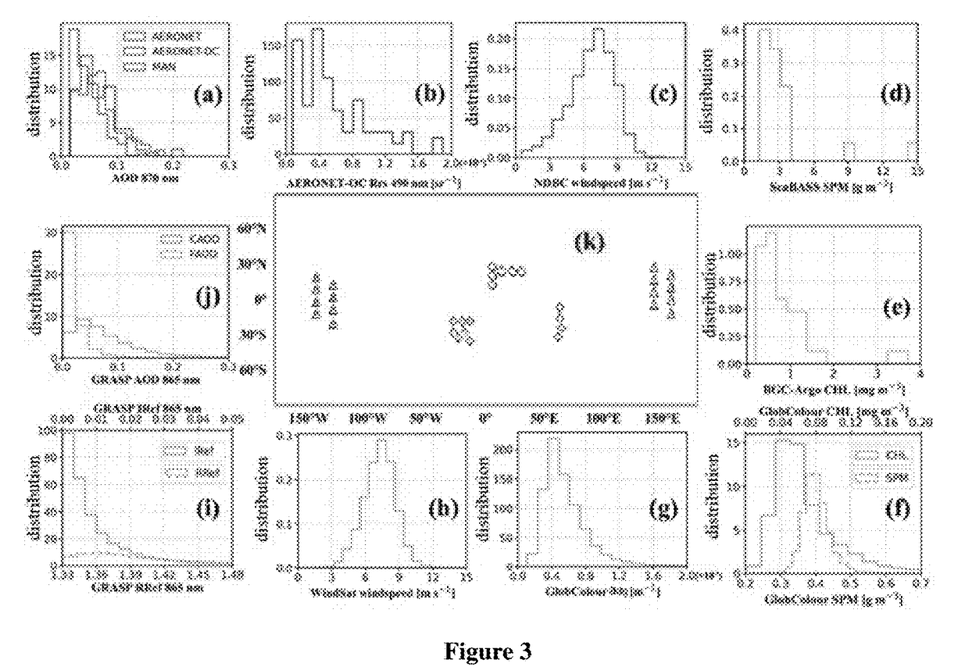
FIG. 3 is a data distribution of global open ocean water according to an embodiment of the disclosure.

Specifically, remote sensing data of multi-angle polarized satellites in the past 20 years is analyzed, and data distribution of the global open ocean water as shown in FIG. 3 is obtained, such as the distribution of atmospheric component parameters (fine/coarse mode aerosol optical thickness, fine/coarse mode aerosol particle size distribution) and water color component parameters (chlorophyll concentration, suspended particulate matter concentration, yellow substance absorption coefficient). Then the data distribution is further analyzed to obtain the basic ocean-atmosphere optical parameter table as shown in Table 1 below. FIG. 3(a) shows the distribution probabilities of aerosol optical thickness (AOD) in the band of 870 nm from three websites AERONET, AeronET-OC and MAN. FIG. 3(b) shows the distribution probability of remote sensing reflectance (Rrs) in the band of 490 nm from the website AERONET-OC. FIG. 3(c) shows the distribution probability of wind speed (W) from the website NDBC. FIG. 3(d) shows the distribution probability of SPM from the website SeaBASS. FIG. 3(e) shows the distribution probability of CHL from the website BGC-Argo. FIG. 3(f) shows the distribution probabilities of SPM and CHL from the website GlobColour. FIG. 3(g) shows the distribution probability of $a_{dg}$ from the website GlobColour. FIG. 3(h) shows the distributed probability of wind speed (W) from the website WindSat. FIG. 3(i) shows the distribution probabilities of RRef and IRef in the band of 865 nm from the website GRASP. FIG. 3(j) shows the distribution probability of AOD (including FAOD and CAOD) in the band of 865 nm from the website GRASP. FIG. 3(k) shows a diagram of sampling points in the global ocean labeled therein.

TABLE 1

| parameter | average value | standard deviation | minimum value | maximum value | distribution |
|---|---|---|---|---|---|
| CAOD (865/670/490) | 0.093/0.092/0.088 | 0.145/0.142/0.135 | 0 | 9.933/10.428/10.219 | normal distribution |
| FAOD (865/670/490) | 0.024/0.039/0.067 | 0.066/0.101/0.156 | 0 | 9.549/16.471/40.371 | normal distribution |
| RRef (865/670/490) | 1.400 | 0.054/0.053/0.052 | 1.330 | 1.600 | normal distribution |
| IRef (865/670/490) | 0.011 | 0.014 | 0 | 0.100 | normal distribution |
| FRm | / | / | 0.1 | 0.3 | uniform distribution |
| CRm | / | / | 1.0 | 2.9 | uniform distribution |
| W | 7.27 | 1.43 | 1.64 | 13.32 | normal distribution |
| CHL | 0.071 | 0.054 | 0.01 | 82.70 | normal distribution |
| $a_{dg}$(440) | 0.006 | 0.003 | 0.001 | 0.999 | normal distribution |
| S | / | / | 0.008 | 0.026 | uniform distribution |
| SPM | 0.403 | 0.085 | 0.119 | 97.691 | normal distribution |

In the table, FAOD/CAOD (865/670/490) represents the fine/coarse mode aerosol optical thickness at 865/670/490 nm, RRef/IRef represents the aerosol complex refraction index real/imaginary parts, FRm/CRm represents the fine/coarse mode aerosol particle size distribution radius, and W represents the sea surface wind speed [unit: m s$^{-1}$], CHL represents the chlorophyll concentration [unit: mg m$^{-3}$], adg(440) represents the yellow substance absorption coefficient at 440 nm [unit: m$^{-1}$], S represents the yellow substance absorption spectrum slope, and SPM represents the suspended particulate matter concentration [unit: g m$^{-3}$].

Based on this, when selecting the sample ocean-atmosphere optical parameters for training the ocean-atmosphere optical parameter model, data consistent with the distribution pattern within a predetermined range can be selected based on the data shown in Table 1, as the sample ocean-atmosphere optical parameters for subsequently constructing the sample set. For example, for selecting the sample ocean-atmosphere optical parameter CAOD, multiple groups of data can be selected with reference to the normal distribution pattern near the mean value 0.093/0.092/0.088, as sample CAOD.

S32, obtaining a sample observation geometry of the multi-angle polarized satellite.

The sample observation geometry includes three angles, namely, a solar zenith Angle (SZA), a view zenith angle (VZA) and a relative azimuth angle (RAA). These three angles are obtained by counting the SZA, VZA, and RAA of the multi-angle polarized satellites over a specific time period, such as one day. In an embodiment, the obtained SZA, VZA, RAA is the SZA, VZA, RAA of multiple pixel points. For example, SZA, VZA, RAA of 600,000 points are randomly selected from the historical satellite remote sensing data of the multi-angle polarized satellites.

S33, inputting the multiple groups of sample ocean-atmosphere optical parameters obtained in S31 and the sample observation geometry obtained in S32 into an Ocean Successive Orders with Atmosphere-Advanced (OSOAA) radiative transfer model, to output a vector apparent reflectance $\vec{\rho}_{TOA}^{w}$ of water-leaving radiance at top of atmosphere, and obtaining a first vector apparent reflectance $\vec{\rho}_{BOA}^{w}$ of water-leaving radiance at bottom of atmosphere above sea surface.

In an embodiment, S33 includes S331 and S332.

S331, inputting the multiple groups of sample ocean-atmosphere optical parameters obtained in S31 and the sample observation geometry obtained in S32 into the Ocean Successive Orders with Atmosphere-Advanced radiative transfer model, to output a vector apparent reflectance $\vec{\rho}_{TOA}^{w}$ of water-leaving radiance at top of atmosphere.

In an embodiment, the vector apparent reflectance $\vec{\rho}_{TOA}^{w}$ of water-leaving radiance at top of atmosphere is obtained by using an existing OSOAA radiative transfer model based on the ocean-atmosphere optical parameters and the observation geometry. The model assumes parallel plane layers and uses the stepwise scattering method.

The OSOAA radiative transfer model may be referred to an existing literature: OSOAA: a vector radiative transfer model of coupled atmosphere-ocean system for a rough sea surface application to the estimates of the directional variations of the water leaving reflectance to better process multi-angular satellite sensors data over the ocean [O]. Chami Malik, Lafrance Bruno, Fougnie Bertrand, 2015.

Specifically, three-dimensional vectors I, Q and U are used to represent the Stokes vector of the vector radiation field of the coupled atmosphere-ocean system, as follows:

$$S = \begin{bmatrix} I \\ Q \\ U \\ V \end{bmatrix} = \begin{bmatrix} \langle |E_x|^2 \rangle + \langle |E_y|^2 \rangle \\ \langle |E_x|^2 \rangle - \langle |E_y|^2 \rangle \\ \langle 2E_x E_y \cos \delta \rangle \\ \langle 2E_x E_y \sin \delta \rangle \end{bmatrix}.$$

Wherein, I represents the total radiance, that is, the radiation intensity received by the water color sensor of the multi-angle polarized satellite, Q represents the linear polarization component of the total radiance in the horizontal or vertical direction, U represents the linear polarization component of the total radiance in the direction of ±45°, and V represents the elliptic polarization component, which is generally negligible in the air-sea system. Ex and Ey are the components of the electric vector along the X and Y directions in the selected coordinate system, δ is the phase difference between the two vibration components, and < > is the average over time. The meanings of the lower corner symbols I, Q and U of the variables in the following text can be referred to here.

Three parameters, denoted by $\rho_I$, $\rho_Q$, $\rho_U$, are calculated by the OSOAA radiative transfer model. $\rho_I$, $\rho_Q$, $\rho_U$ are part of Stokes vector values of the apparent vector radiation field with respect to extraterrestrials solar irradiance ($\pi$).

Specifically, in the OSOAA radiative transfer model, the apparent reflectance value normalized from the Stokes vector at TOA to extraterrestrial solar irradiance can be expressed as:

$$\vec{\rho}_t = \pi \cdot \vec{L}_t / F_0$$

In the formula, $\vec{\rho}_t = [\rho_I, \rho_Q, \rho_U]$.

$\pi$ is Pi, and $F_0$ represents the value of extraterrestrial solar irradiance at each band, which can be directly calculated by the OSOAA radiative transfer model.

The radiation field received by the polarized satellite at top of atmosphere may be expressed as:

$$\vec{L}_t(\lambda) = \vec{L}_r(\lambda) + \vec{L}_a(\lambda) + \vec{T}(\lambda)\vec{L}_g(\lambda) + \vec{t}(\lambda)\vec{L}_{wc}(\lambda) + \vec{t}(\lambda)\vec{L}_w(\lambda)$$

Wherein, $\vec{L}_t$ is the total vector radiation at TOA; $\vec{L}_r$ is the vector radiation value contributed by molecular (Rayleigh) scattering; $\vec{L}_a$ is the vector radiation value contributed by aerosol scattering/absorption including aerosol and Rayleigh scattering interaction; $\vec{L}_g$ is the vector radiation value contributed by the solar flare; $\vec{L}_{wc}$ is the vector radiation value contributed by surface foam; $\vec{L}_w$ is the vector water-leaving radiance value at bottom of atmosphere above sea surface (BOA); and $\vec{t}$ and $\vec{T}$ represent the atmospheric diffuse and direct transmittance of vector radiation at BOA respectively.

The above $F_0$ and $\vec{L}_t(\lambda)$ can be calculated by the OSOAA radiative transfer model based on the multiple groups of ocean-atmosphere optical parameters and the observation geometry inputted into the model, which are not detailed here.

In addition, in an embodiment, the calculation of the scattering matrix $F_{oc}$ of the open ocean water body in the OSOAA radiative transfer model is also improved. The traditional calculation of $F_{oc}$ in the OSOAA radiative transfer model involves many parameters and is complicated, which leads to a long calculation time and occupies a lot of computing resources.

In the embodiment, it is considered that the scattering and absorption properties of seawater are mainly determined by water molecules, suspended particles (such as phytoplankton, minerals and detritus), and yellow substances. To characterize the optical properties of water, the absorption coefficient of the water molecules ($a_w(\lambda)$), with wavelengths ranging from 400 to 700 nm and 700 to 900 nm, and the scattering coefficient of the water molecules ($b_w(\lambda)$) are considered. In view of this, in an embodiment, a method of calculating $F_{oc}$ is proposed, that is, the scattering matrix $F_{oc}$ of the open ocean water body may be expressed as a function of wavelength and scattering angle:

$$F_{oc} \equiv F_{oc}(\lambda, \Theta) = \frac{b_w(\lambda)F_w(\Theta) + b_{ph}(\lambda)F_{ph}(\Theta) + b_{SPM}(\lambda)F_{SPM}(\Theta)}{b_w(\lambda) + b_{ph}(\lambda) + b_{SPM}(\lambda)}.$$

Wherein, $\Theta$ represents the scattering angle, $b_w(\lambda)$, $b_{ph}(\lambda)$ and $b_{SPM}(\lambda)$ represent the scattering coefficients of pure seawater, phytoplankton and suspended particulate matter (minerals and detrites) respectively. $F_w(\Theta)$, $F_{ph}(\Theta)$ and $F_{SPM}(\Theta)$ represent the scattering matrices of pure seawater, phytoplankton components and suspended particulate matter respectively. $F_w(\Theta)$ can be approximated using Rayleigh scattering approximation, while $F_{ph}(\Theta)$ and $F_{SPM}(\Theta)$ can be calculated through Junge's law with the range of 0.1-200 μm and the slope of 4.0 that the distribution of the phytoplankton particle size generally follows. The refractive index of phytoplankton is set as 1.05. Similarly, the scattering coefficient of the suspended particulate matter is calculated using Junge's law with the range of 0.1-50 μm, the slope of 3.5 and the refractive index of 1.15.

Therefore, the vector apparent reflectance $\vec{\rho}_{TOA}{}^w$ of water-leaving radiance at top of atmosphere can be calculated out.

S332, calculating the first vector apparent reflectance $\vec{\rho}_{BOA}{}^w$ of water-leaving radiance at bottom of atmosphere above sea surface based on the $\vec{\rho}_{BOA}{}^w$.

In an embodiment, $\vec{\rho}_{BOA}{}^w$ is obtained based on $\vec{\rho}_{TOA}{}^w$ by using an atmospheric diffuse transmittance lookup table (PLUT). The lookup table can be expressed by the formula:

$$\vec{T}(\lambda) = \frac{\vec{\rho}_{TOA}^w}{\vec{\rho}_{BOA}^w}$$

The method of using the atmospheric diffuse transmittance lookup table (PLUT) can be referred to patent CN114544452B, which will not be detailed here.

The $\vec{\rho}_{BOA}{}^w$ generated based on $\vec{\rho}_{TOA}{}^w$ by using the lookup table is taken as the first $\vec{\rho}_{BOA}{}^w$, which is only the roughly calculated $\vec{\rho}_{BOA}{}^w$ value, and which will be subsequently inputted into the ocean-atmosphere optical parameter model during training to optimize the parameters of the ocean-atmosphere optical parameter model.

Thus, the input sample set {$\vec{\rho}_{TOA}{}^w$, first $\vec{\rho}_{BOA}{}^w$, observation geometry} for training the ocean-atmosphere optical parameter model is obtained, where the first $\vec{\rho}_{BOA}{}^w$ is the rough first $\vec{\rho}_{BOA}{}^w$ value.

The corresponding output sample set is {$\vec{\rho}_{BOA}{}^w$, fine/coarse mode aerosol optical thickness, fine/coarse mode aerosol particle size distribution radius, sea surface wind speed, chlorophyll concentration, suspended particulate matter concentration}, where $\vec{\rho}_{BOA}{}^w$ is the exact $\vec{\rho}_{BOA}{}^w$ value.

S34, training the ocean-atmosphere optical parameter model by using the multiple groups of sample ocean-atmosphere optical parameters, the sample observation geometry, the vector apparent reflectance $\vec{\rho}_{TOA}{}^w$ of water-leaving radiance at top of atmosphere and the first vector apparent reflectance $\vec{\rho}_{BOA}{}^w$ of water-leaving radiance at bottom of atmosphere above sea surface.

In an embodiment, the ocean-atmosphere optical parameter model includes three modules: a $\vec{\rho}_{BOA}{}^w$ module, an atmosphere module and a water color module. The $\vec{\rho}_{BOA}{}^w$ module is configured to output $\vec{\rho}_{BOA}{}^w$ based on the inputted observation geometry and $\vec{\rho}_{TOA}{}^w$, the atmosphere module is configured to output the fine/coarse mode aerosol optical thickness, the fine/coarse mode aerosol particle size distribution radius and the sea surface wind speed based on the inputted observation geometry and $\vec{\rho}_{TOA}{}^w$, and the water color module is configured to output the chlorophyll concentration and the suspended particulate matter concentration based on $\vec{\rho}_{BOA}{}^w$ outputted from the $\vec{\rho}_{BOA}{}^w$ module.

In an embodiment, the three modules are all based on an XGBoost model. The XGBoost model is an efficient and widely used machine learning method in the field of marine color remote sensing, which uses sparse perception algorithm to process sparse data and uses weighted quantile sketch for approximation learning. The algorithm trains a tree set model to predict the output y of a given input data set by minimizing a regularized objective function L, where the data set has features of m dimensions and n instances. The tree set is determined by minimizing the regularization objective function L, and the function includes two terms: the sum of the loss function $l(\hat{y}_i, y_i)$ for all instances i, and the regularization term $\Omega(f_k)$ for all trees k:

$$L = \sum_i l(\hat{y}_i, y_i) + \sum_k \Omega(f_k)$$

The regularization term $\Omega(f_k)$ limits the complexity of the model to reduce overfitting. The XGBoost model improves the set model by continuously adding regression trees through a "greedy algorithm". This method continuously updates the model output by minimizing the objective function. At the same time, the XGBoost model adopts a reduction strategy to mitigate overfitting. After each lift step, the newly added weights are scaled by a learning rate factor, thus reducing the impact of the future tree on the existing tree. This approach reduces the risk of overfitting compared to other traditional machine learning models.

The accuracy of the XGBoost algorithm depends largely on the learning ability of the data. In an embodiment, to ensure comprehensive coverage of atmosphere-ocean conditions, the XGBoost structure is set up as follows: setting booster to gbtree, setting objective to reg:squarederror, setting gamma (minimum loss reduction required for further partitioning) to 0.5, setting maximum tree depth to 10, setting lambda (L2 regularization term of weight) to 10, setting the subsample proportion of the training instances to 0.85, setting the step shrinkage rate to 0.05 to prevent overfitting, and limiting the number of lifting iterations to 200. The modified structure ensures fast convergence and prevents overfitting by processing only 85% of the training data in each lift iteration.

In an embodiment, selecting 500,000 combinations from historical satellite remote sensing data of multi-angle polarized satellites, including CAOD (490/670/865), FAOD (490/670/865), RRef (490/670/865), IRef (490/670/865), CHL, $a_{dg}$ (440), SPM, and W.

The aerosol particle size can be represented by a combination of the lognormal distributions of the coarse mode and the fine mode, where the volume density distribution is represented as:

$$\frac{dV(r)}{d \ln r} = \sum_{i=1}^{2} \frac{C_{V,i}}{\sigma_i \sqrt{2\pi}} \times \exp\left[-\frac{1}{2}\left(\frac{\ln r - \ln r_i}{\sigma_i}\right)^2\right]$$

Wherein, $C_{V,i}$, $r_i$ and $\sigma_i$ represent the volume concentration, median radius and standard deviation of the particle in mode i, respectively. To simplify VRTS, CRm and FRm are randomly selected in the range of 0.1-0.3 μm and 1.0-2.9 μm. The standard deviations ($\sigma_c$ and of) of coarse and fine mode aerosol sizes are fixed at 0.50 and 0.35 respectively. The spectral slope factor S, which describes the logarithmic decay of yellow substance absorption, was randomly selected in the measurement range 0.008-0.026.

In an embodiment, a total of 89 inversion models are generated, including:

78 polarized water-leaving radiance component atmospheric correction models, including: 2 wavelengths (490/670 nm), 13 observed orientations, and 3 Stokes vectors (I/Q/U);

9 atmospheric component parameter inversion models, including: two AOD for coarse and fine modes, three wavelengths (490/670/865 nm), coarse and fine mode aerosol particle radius, and sea surface wind speed models; and 2 water color component parameter inversion models, one is a chlorophyll model and the other is a suspended particulate matter model.

In an embodiment, 500,000 points are randomly selected from the data of the multi-angle polarized remote sensing satellites, and the first 13 valid observations are used for each point, eventually involving a combination of about 6.5 million observation geometries at S13. Finally, the inversion results of three Stokes vectors can be obtained.

In an embodiment, in order to overcome the problem of small magnitude of water-leaving radiance component, the vector apparent radiation quantity $\vec{\rho}_{I,TOA}^{w}$ at top of atmosphere is logarithmically processed:

$$\vec{\rho}_{TOA} \rightarrow \text{sign}(\vec{\rho}_{TOA}) \cdot \log_{10}|\vec{\rho}_{TOA}|$$

$$\text{sign}(x) = \begin{cases} 1, & x > 0 \\ 0, & x = 0 \\ -1, & x < 0 \end{cases}$$

In addition to logarithmic operation on $\vec{\rho}_{I,TOA}$, the sample $|\vec{\rho}_{BOA}^{w}(670)| < 0.02 \times 10^{-3}$ will be excluded during machine learning training due to calculation errors in vector radiative transfer simulation.

Finally, the number of input and output samples is shown below:

$\vec{\rho}_{BOA}^{w}$ inversion in the $\vec{\rho}_{BOA}^{w}$ module: 58500000 groups of the simulated radiative transfer value $\vec{\rho}_{I,TOA}^{w}$ at TOA correspond to 39000000 groups of polarization water-leaving radiance $\vec{\rho}_{BOA}^{w}$ (excluding the value at 865 nm);

CAOD (FAOD) inversion in the atmospheric module: 58500000 groups of the simulated radiative value $\vec{\rho}_{I,TOA}^{w}$ at TOA correspond to 1500000 groups of CAOD (FAOD) values;

CRm (FRm) inversion in the atmospheric module: 58500000 groups of the simulated radiative value $\vec{\rho}_{I,TOA}^{w}$ at TOA correspond to 500000 groups of CRm (FRm) values;

Sea surface wind speed inversion in the atmosphere module: 58500000 groups of the simulated radiative value $\vec{\rho}_{I,TOA}^{w}$ at TOA correspond to 500000 groups of sea surface wind speeds;

Chlorophyll concentration inversion in the water color module: 39000000 groups of polarization water-leaving radiance $\vec{\rho}_{BOA}^{w}$ correspond to 500000 groups of the chlorophyll concentrations; and Suspended particulate matter concentration inversion in the water color module: 39000000 groups of polarization water-leaving radiance $\vec{\rho}_{BOA}^{w}$ correspond to 500000 groups of suspended particulate matter concentrations.

The embodiment significantly improves the stability and robustness of the XGBoost machine learning model during training by increasing the observation angles and the vector signals. The training results show that the 13 observed orientations and polarization radiation effectively capture the microphysical properties of aerosols and play a key role in polarization remote sensing measurement.

In addition, in order to enhance the stability of the model when applied to polarization remote sensing data, 3% noise is introduced into the TOA apparent reflectance in the training data set.

Figure 4:
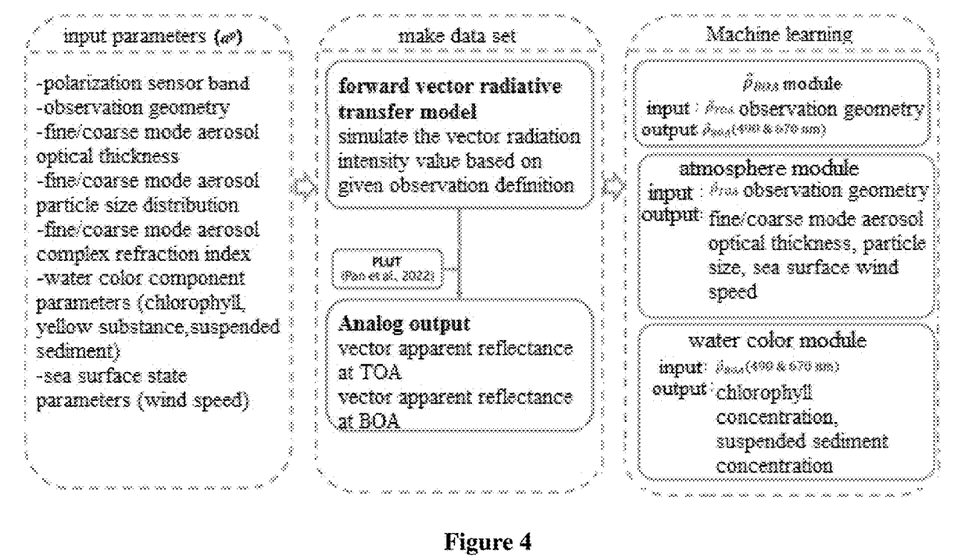
FIG. 4 is a block diagram of a training process of the ocean-atmosphere optical parameter model according to an embodiment of the disclosure.

FIG. 4 is a block diagram of the above training process of the ocean-atmosphere optical parameter model.

After training, the output results of the ocean-atmosphere optical parameter model can be verified and the training parameters can be optimized by using the measured values of global sea stations.

So far, the training of the ocean-atmosphere optical parameter model is completed.

Based on the above solutions, the ocean-atmosphere optical parameters can be quickly and stably inverted.

In addition, in an embodiment, the ocean-atmosphere optical parameters may further include concentration of inorganic particulate matter (IPM) in water body. Specifically, $\vec{\rho}_{I,BOA}^{w}$, $\rho_{Q,BOA}$, $\rho_{U,BOA}^{w}$ calculated using the polarization angle (Brewster Angle) can be used to obtain the degree of linear polarization, and further obtain the concentration of inorganic particulate matter (IPM) in water body:

$$DoLP = \frac{\sqrt{(\rho_{Q,BOA}^{w})^2 + (\rho_{U,BOA}^{w})^2}}{\rho_{I,BOA}^{w}}$$

$$IPM = 1.469 \ \ln(DoLP - 44.498) + 5.957$$

Thus the turbidity of water can be reflected.

In an embodiment, a device for inverting ocean-atmosphere optical parameters are further provided. The device includes a memory and a processor coupled to the memory, the processor is configured to execute, based on instructions stored in the memory, steps of the method for inverting ocean-atmosphere optical parameters in any of the above embodiments.

The memory may be system memory or fixed non-volatile storage media, etc. System memory can store operating systems, applications, boot loaders, databases, and other programs.

In an embodiment, a computer storage medium, which is a computer readable storage medium such as a memory including computer programs, is further provided. The computer programs can be executed by a processor to execute steps of the method for inverting ocean-atmosphere optical parameters in any of the above embodiments.

The above is only a schematic implementation of this application, without deviating from the concept and principles of this application, any equivalent changes and modifications made by skilled personnel in the field shall fall within the scope of protection of this application.

The invention claimed is:

1. A method for inverting ocean-atmosphere optical parameters, comprising:

obtaining a vector apparent reflectance $\rho_I$, $\rho_Q$, $\rho_U$ of water-leaving radiance at top of atmosphere and observation geometry of a multi-angle polarized satellite, wherein the observation geometry comprises three angles: a solar zenith angle, a view zenith angle and a relative azimuth angle;

inputting the vector apparent reflectance $\rho_I$, $\rho_Q$, $\rho_U$ and the observation geometry into a trained ocean-atmosphere optical parameter model, to output a group of ocean-atmosphere optical parameters, wherein the output ocean-atmosphere optical parameters comprise: a vector apparent reflectance $\vec{\rho}_{BOA}^{\,w}$ of water-leaving radiance at bottom of atmosphere above sea surface of the multi-angle polarized satellite, a fine/coarse mode aerosol optical thickness, a fine/coarse mode aerosol particle size distribution radius, a sea surface wind speed, a chlorophyll concentration and a suspended particulate matter concentration;

wherein the ocean-atmosphere optical parameter model is an XGBoost machine training model, wherein the method further comprises training the ocean-atmosphere optical parameter model, and the training comprises:

obtaining multiple groups of sample ocean-atmosphere optical parameters, wherein the sample ocean-atmosphere optical parameters in each group comprise a sample fine/coarse mode aerosol optical thickness, a sample aerosol complex refraction index real/imaginary part, a sample fine/coarse mode aerosol particle size distribution radius, a sample sea surface wind speed, a sample chlorophyll concentration, a sample yellow substance absorption coefficient, a sample yellow substance absorption spectrum slope, and a sample suspended particulate matter concentration;

obtaining a sample observation geometry of the multi-angle polarized satellite;

inputting the multiple groups of sample ocean-atmosphere optical parameters and the sample observation geometry into an Ocean Successive Orders with Atmosphere-Advanced radiative transfer model, to output a vector apparent reflectance $\vec{\rho}_{TOA}^{\,w}$ of water-leaving radiance at top of atmosphere, and obtaining a first vector apparent reflectance $\vec{\rho}_{BOA}^{\,w}$ of water-leaving radiance at bottom of atmosphere above sea surface; and training the ocean-atmosphere optical parameter model by using the multiple groups of sample ocean-atmosphere optical parameters, the sample observation geometry, the vector apparent reflectance $\vec{\rho}_{TOA}^{\,w}$ of water-leaving radiance at top of atmosphere and the first vector apparent reflectance $\vec{\rho}_{BOA}^{\,w}$ of water-leaving radiance at bottom of atmosphere above sea surface; and wherein the method further comprises optimizing the ocean-atmosphere optical parameter model by retrieving, from a plurality of global sea stations, measured values corresponding to actual atmospheric-ocean conditions, generating a plurality of output results from the ocean-atmosphere optical parameter model based on a portion of the actual atmospheric-ocean conditions, and comparing the plurality of output results to actual atmospheric-ocean conditions not included in the portion.

2. The method according to claim 1, wherein the ocean-atmosphere optical parameter model comprises a $\vec{\rho}_{BOA}^{\,w}$ module, an atmosphere module and a water color module, wherein the $\vec{\rho}_{BOA}^{\,w}$ module is configured to output $\vec{\rho}_{BOA}^{\,w}$ based on the inputted sample observation geometry and $\vec{\rho}_{TOA}^{\,w}$, the atmosphere module is configured to output the sample fine/coarse mode aerosol optical thickness, the sample fine/coarse mode aerosol particle size distribution radius and the sample sea surface wind speed based on the inputted sample observation geometry and $\vec{\rho}_{TOA}^{\,w}$, and the water color module is configured to output the sample chlorophyll concentration and the sample suspended particulate matter concentration based on $\vec{\rho}_{BOA}^{\,w}$ outputted from the $\vec{\rho}_{BOA}^{\,w}$ module.

3. The method according to claim 2, wherein the $\vec{\rho}_{BOA}^{\,w}$ module, the atmosphere module and the water color module are all based on an XGBoost model.

4. The method according to claim 3, wherein training the ocean-atmosphere optical parameter model further comprises:

logarithmic processing a vector apparent radiation quantity $\vec{\rho}_{I,TOA}$ at top of atmosphere by:

$$\vec{\rho}_{TOA} \rightarrow \mathrm{sign}(\vec{\rho}_{TOA}) \cdot \log_{10}|\vec{\rho}_{TOA}|$$

wherein $$\mathrm{sign}(x) = \begin{cases} 1, & x > 0 \\ 0, & x = 0 \\ -1, & x < 0 \end{cases}.$$

5. The method according to claim 1, wherein obtaining multiple groups of sample ocean-atmosphere optical parameters comprises:

analyzing historical remote sensing data of the multi-angle polarized satellite to obtain a basic ocean-atmosphere optical parameter table, wherein the basic ocean-atmosphere optical parameter table comprises: a distribution, a maximum value, a minimum value, an average value and a standard deviation of each of fine/coarse mode aerosol optical thicknesses, aerosol complex refraction index real/imaginary parts, fine/coarse mode aerosol particle size distribution radiuses, sea surface wind speeds, chlorophyll concentrations, yellow substance absorption coefficients, yellow substance absorption spectrum slopes and suspended particulate matter concentrations; and selecting the multiple groups of sample ocean-atmosphere optical parameters based on the distribution, the maximum value, the minimum value, the average value and the standard deviation of each parameter in the basic ocean-atmosphere optical parameter table.

6. The method according to claim 1, wherein inputting the multiple groups of sample ocean-atmosphere optical parameters and the sample observation geometry into the Ocean Successive Orders with Atmosphere-Advanced radiative transfer model, to output a vector apparent reflectance $\vec{\rho}_{TOA}^{\,w}$ of water-leaving radiance at top of atmosphere comprises:

calculating a scattering matrix $F_{oc}$ of open ocean water by following formula:

$$F_{oc} \equiv F_{oc}(\lambda, \Theta) = \frac{b_w(\lambda)F_w(\Theta) + b_{ph}(\lambda)F_{ph}(\Theta) + b_{SPM}(\lambda)F_{SPM}(\Theta)}{b_w(\lambda) + b_{ph}(\lambda) + b_{SPM}(\lambda)}$$

wherein $\Theta$ is a scattering angle, $b_w(\lambda)$, $b_{ph}(\lambda)$ and $b_{SPM}(\lambda)$ are scattering coefficients of pure seawater, phytoplankton and suspended particulate matter respectively, and $F_w(\Theta)$, $F_{ph}(\Theta)$ and $F_{SPM}(\Theta)$ are scattering matrixes of pure seawater, phytoplankton and suspended particulate matter respectively.

7. The method according to claim 1, wherein the ocean-atmosphere optical parameters further comprise concentration of inorganic particulate matter in water body, and
wherein the method further comprises calculating the concentration of inorganic particulate matter (IPM) in water body based on a degree of linear polarization (DoLP) by following formula:

$$DoLP = \frac{\sqrt{(\rho^w_{Q,BOA})^2 + (\rho^w_{U,BOA})^2}}{\rho^w_{I,BOA}}$$

$$IPM = 1.469 \ln(DoLP - 44.498) + 5.957$$

wherein $\vec{\rho}^w_{I,BOA}$, $\rho^w_{Q,BOA}$, $\rho^w_{U,BOA}$ are calculated through a polarization angle.

8. A device for inverting ocean-atmosphere optical parameters, comprising: a memory and a processor coupled to the memory, the processor is configured to execute, based on instructions stored in the memory, steps of the method according to claim 1.

9. A non-transitory computer-readable storage medium comprising an executable program stored thereon, wherein the executable program, when being executed, execute steps of the method according to claim 1.

10. The method according to claim 1, wherein obtaining multiple groups of sample ocean-atmosphere optical parameters comprises:
accessing a plurality of records of historical remote sensing data of the multi-angle polarized satellite;
randomly selecting, from the plurality of records, over a predetermined measurement range, a random selection of records,
generating, from the random selection of records, a basic ocean-atmosphere optical parameter table, wherein the basic ocean-atmosphere optical parameter table comprises: a distribution, a maximum value, a minimum value, an average value and a standard deviation of each of fine/coarse mode aerosol optical thicknesses, aerosol complex refraction index real/imaginary parts, fine/coarse mode aerosol particle size distribution radiuses, sea surface wind speeds, chlorophyll concentrations, yellow substance absorption coefficients, yellow substance absorption spectrum slopes and suspended particulate matter concentrations; and
selecting the multiple groups of sample ocean-atmosphere optical parameters based on the distribution, the maximum value, the minimum value, the average value and the standard deviation of each parameter in the basic ocean-atmosphere optical parameter table.

11. The method according to claim 1, wherein obtaining the multiple groups of sample ocean-atmosphere optical parameters is performed by selecting from a data set having n instances, wherein each of the multiple groups comprises a predetermined fraction of the n instances that is less than all of the n instances based on a predetermined subsample proportion; and
wherein obtaining each of the multiple groups further comprises introducing a predetermined amount of noise into the each of the multiple groups.

* * * * *